United States Patent Office 3,330,342
Patented July 11, 1967

3,330,342
SECONDARY RECOVERY PROCESS FOR LOW PRESSURE OIL-BEARING RESERVOIRS
Leroy W. Holm, Crystal Lake, Ill., assignor, by mesne assignments, to Union Oil Company of California, Los Angeles, Calif., a corporation of California
No Drawing. Filed Mar. 16, 1964, Ser. No. 352,335
16 Claims. (Cl. 166—2)

This invention relates to the secondary recovery of petroleum from subterranean formations and more particularly to an improved process for recovering oil which involves the injection of various fluids, under novel conditions, to stimulate production of oil from oil reservoirs from which production by conventional methods has decreased to a stage where further recovery by such methods is no longer profitable.

In normal oil production techniques during a first or primary period, natural earth pressures are relied upon to facilitate the production of oil. Primary recovery can be continued until the pressure existent in the reservoir is so depleted that economic oil recovery can no longer be obtained. In general, however, primary recovery techniques can secure production of only twenty to twenty-five percent of the oil in a reservoir.

In order to increase recovery, a variety of secondary recovery processes have been employed. Usually, a drive fluid such as water is injected into the reservoir through an injection well so as to drive oil through the oil-bearing strata to a production well. The present invention, which is concerned with this general technique of employing a fluid drive, provides an improved process which comprises the injection of low-molecular-weight hydrocarbons and carbon dioxide or carbon dioxide alone to force oil from a hydrocarbon-bearing formation by the use of carbonated water.

While the general principles of secondary processes have long been appreciated, practical difficulties exist which have seriously limited the value of known procedures. The principal problem has been that oil displacement in a reservoir by a driving fluid is normally inefficient. For example, by the use of water, which has been employed in secondary recovery procedures, it usually has been impossible to recover some fifty percent of the oil originally contained in a reservoir. More recently, oil recovery has been increased by a method involving the injection of a solvent and water into some of the wells in a producing field and the production of oil from adjacent wells.

Generally, the solvent-water technique has not proved to be as efficient as was expected. In this method, an oil-miscible liquid displaces the formation oil and the oil-miscible liquid is in turn displaced with a low-cost scavenging fluid which may be left in the reservoir. The oil-miscible liquid is preferably one which will dissolve in the oil and substantially reduce the viscosity of the oil with which it mixes. The use of various oil viscosity-reducers has been proposed and it is well known in the art that mixtures of low-molecular-weight hydrocarbons, known commercially as "liquified petroleum gas" or LPG, are especially suitable as petroleum solvents. A further refinement of the "LPG" waterflood secondary recovery technique is one wherein a slug of carbon dioxide is injected between the hydrocarbon solvent and the flood water. The beneficial use of carbon dioxide as an intermediary has been attested to by increased oil recoveries. However, the use of carbon dioxide as an intermediary or as the sole solvent has precipitated several unfavorable factors which this invention solves. For instance, carbon dioxide lends its attributes in secondary oil recovery only when used under certain pressure conditions, usually above 700 p.s.i. Another problem is the inherent loss of the carbon dioxide to the reservoir oil, connate water and subsequent drive media which loss substantially reduces the effectiveness of the carbon dioxide slug.

However, by using a flood medium, part of which is carbonated, the effectiveness of the carbon dioxide slug is enhanced, thereby achieving greater oil recovery.

Also, the inherent solubility characteristics of carbon dioxide, as a function of pressure, necessitate that subterranean oil bearing formations be produced at a high pressure level, preferably in excess of about 700 p.s.i. However, to build up this high pressure, continuous pumping of the compressible fluid for several days or even for many months has been necessary.

The present invention relates to a novel secondary recovery technique in which a low-molecular-weight hydrocarbon and a gas comprising carbon dioxide is employed in a unique manner, thereby utilizing the peculiar properties of carbon dioxide in the recovery of oil from underground reservoirs. In another embodiment, wherein carbon dioxide alone is utilized, in the absence of a hydrocarbon solvent, unexpected oil recoveries have been observed.

Specifically, this invention provides an improved secondary recovery process using a low-molecular-weight hydrocarbon and carbon dioxide wherein a slug of the hydrocarbon and a slug of carbon dioxide or a slug of the carbon dioxide alone is injected into a partially depleted reservoir to establish a reservoir pressure of at least 700 p.s.i. Thereafter, an aqueous medium is injected into the reservoir to cause the bank (or banks) of liquid light hydrocarbon and carbon dioxide or carbon dioxide alone to contact the reservoir oil and pass through the reservoir while a pressure in excess of 700 p.s.i. is maintained in the reservoir. It is recognized, in the oil recovery art, that the pressure in that portion of a reservoir immediately surrounding a producing well, which is being pumped, may be appreciably less than the pressure in the major portion of the reservoir. Nevertheless, the benefits of this invention are attained as long as the major portion of the reservoir, in which the method of this inventin is being applied, is mantained above 700 p.s.i. even though the pressure immediately around producing wells might be less than 700 p.s.i. Thus, throughout this specification and appended claims, reservoir pressure is taken to mean the pressure in at least a major portion of the reservoir in which the invention is being practiced. At least the portion of the aqueous medium immediately behind the carbon dioxide should be carbonated. Finally, as an integral step in the novel process which has been discovered, injection of the aqueous medium is terminated and the reservoir is depressured to atmospheric pressure by pumping down the production well, thereby recovering still additional oil from the reservoir.

In a preferred embodiment of the present invention, an oil-bearing reservoir to be treated in accordance with the novel process is first prepressured to a pressure of about at least 700 p.s.i.

It is an object of this invention to provide novel means of pressuring a reservoir wherein improved recoveries of oil are subsequently obtained using the embodiments of this invention.

It is an object of this invention to provide an improved method of recovering oil from subterranean formations using a low-molecular-weight hydrocarbon, carbon dioxide and a fluid drive under particular conditions.

Still another object of this invention is to provide an improved secondary recovery method using carbon dioxide and carbonated water at pressures in excess of about 700 p.s.i.

These and other objects will become more apparent from the following detailed description of this invention.

In some instances where the reservoir pressure is below 700 p.s.i., and the reservoir is penetrated by at least one injection well and one producing well, gas may be injected into the producing well while simultaneously injecting LPG, carbon dioxide and carbonated water, in sequence, into the injection well. Other suitable methods for raising the reservoir pressure to the optimum point, as heretofore indicated, include (1) simultaneous injection of gas into the production well and injection of carbonated water into the injection well, and (2) shutting in the injection well while injecting gas into the production well until the desired reservoir pressure is reached. Suitable alternative means to raise the formation pressure also include shutting in the production well while injecting either carbonated water, plain water or gas and combinations thereof into the injection well. Once the requisite pressure is achieved, slugs of low-molecular-weight hydrocarbon and carbon dioxide or carbon dioxide alone are injected into the reservoir. Thereafter, an aqueous fluid, at least the initial part of which is carbonated, is injected to cause the banks of low-molecular-weight hydrocarbon and carbon dioxide or only carbon dioxide, to pass through the reservoir in contact with the oil contained therein while maintaining a pressure in the reservoir of at least 700 p.s.i. The reservoir is then depressured.

When carbonated water is used as a pressuring means, the carbon dioxide contained therein and in the subsequently injected drive medium comes out of solution when the reservoir is depressured and aids in further recovery of oil. The pressure of the injected fluids and the quantity of the various fluids injected must be determined from a study of each individual reservoir. In general, it it desirable to inject the minimum effective quantities of liquefiable, low-molecular-weight hydrocarbon and carbon dioxide. It is, however, necessary that the quantities injected be sufficient to prevent a complete break-down in either the hydrocarbon or carbon dioxide zone. To maintain the integrity of the carbon dioxide zone it is critical to this invention that at least part of the aqueous flood medium be carbonated, thereby replenishing the carbon dioxide previously injected in slug form and preventing dissolving of the carbon dioxide bank into the drive water.

The quantity of low-molecular-weight hydrocarbon injected generally will be between 0.01 and 0.1 reservoir pore volume. The quantity of carbon dioxide should preferably be larger than the quantity of injected hydrocarbon, to allow for bypassing by the driving aqueous fluid and the loss of some carbon dioxide as a residual saturation in the reservoir and into the connate water in the formation, and generally will be about 0.01 to 0.30 reservoir pore volume. The carbon dioxide slug may contain other constituents but should comprises at least 85 percent carbon dioxide. The aqueous water drive will generally entail a large quantity of fluid, of which at least 0.15 reservoir pore volume must be carbonated and must be at least 50 percent saturated with carbon dioxide at reservoir temperature and pressure. It is important that the pressure in at least a major portion of the reservoir be maintained no lower than 700 p.s.i. while carrying out this invention. Thus, production of fluid from the reservoir should not be commenced until this pressure is reached, and the pressure should be maintained or increased in the reservoir during fluid production until further production becomes uneconomical, usually when the water-oil ratio reaches about 50:1. At this pressure, carbon dioxide is completely miscible with the low-molecular-weight hydrocarbon and satisfactorily mixes and dissolves in the injected aqueous medium.

In employing the process of this invention in the exploitation of a petroleum reservoir, conventional production equipment is utilized. Because the system requires the injection of fluids into a subterranean geological petroleum reservoir, it is necessary that a combination of injection and production wells be employed. The injected fluids, including the low-molecular-weight hydrocarbon carbon dioxide and carbonated flood waters, are introduced into the injection well in a conventional manner taking into consideration the elevated pressure at which a portion of these fluids are introduced. Because the particular practices and techniques employed for injection of gaseous and/or liquid fluids into a reservoir are within the skill of one working in the art, and outside the scope of this invention, the mechanical equipment necessary for the introduction of the injection fluids and/or gases of this invention is left to the choice of such worker.

The liquefiable low-molecular-weight hydrocarbon injected into the petroleum reservoir, in accordance with this invention, may be any low-molecular-weight hydrocarbon or hydrocarbon mixture which can be maintained in the liquid state at reservoir temperature and pressure, at the time the reservoir is being produced, and with which carbon dioxide is substantially completely miscible. Non-limiting examples of suitable hydrocarbons include propane, "LPG," compressor condensate, butane, gasoline, natural gasoline and all hydrocarbon fractions having a boiling point equal to or lower than that of kerosine. "LPG" is recognized in the petroleum industry as a term representing certain liquefied petroleum gases, these gases being petroleum fractions lighter than gasoline, such as butane, propane, etc., and mixtures thereof which remain in the liquid state when maintained under pressure. As used herein and in the petroleum industry, "compressor condensate" refers to the liquid fraction obtained as a result of compressing natural gas for pipe line transmission. These condensates are rich in butane and pentane but contain minor amounts of propane and lighter hydrocarbons and of hexane and heavier hydrocarbons.

Advantageously, a driving fluid comprising essentially water, at least 0.15 of a reservoir pore volume of which is carbonated to a minimum of 50 percent saturation with carbon dioxide, is employed to cause the bank or slug of low-molecular-weight hydrocarbon and carbon dioxide or carbon dioxide alone to pass through the reservoir. In some instances it may be desirable to add a viscosity-increasing agent to at least part of the driving fluid to thereby adjust the viscosity so as to be of the order of or greater than that of the oil to be recovered. Conventional surface active agents and emulsifiers can also be employed. The aqueous driving fluid functions to drive or force the low-molecular-weight hydrocarbon and carbon dioxide or carbon dioxide alone through the reservoir in contact with the oil contained therein without substantially decreasing the reservoir pressure. At all times when the aqueous driving fluid is being injected into the reservoir, the reservoir at the production well is maintained preferably at a pressure of the same order of magnitude as at the injection well but sufficiently below the injection pressure so as to permit oil to flow through the reservoir.

As an example of the process of this invention, an 8 foot long Berea sandstone core, at a temperature of 125° F., is saturated to 55% pore volume with a 40° API crude oil. In accordance with this invention, natural gas is injected into one end of the core and 0.05 pore volume of propane followed by 0.10 pore volume of carbon dioxide is injected into the other end until the core pressure reaches 1150 p.s.i.g. After the desired quantities of propane and carbon dioxide are injected and the desired pressure is reached, natural gas injection is terminated and 0.5 pore volume of carbonated water or brine is injected following the carbon dioxide. Oil recovery at a water-to-oil ratio of 100:1 is 69% of the original oil in place, and during depletion to atmospheric pressure an additional 8.3% of the oil originally in place is obtained.

For comparison, a similar core, at 125° F. and 700 p.s.i. pressure, is flooded under similar conditions. However, natural gas is not injected into one end of the core. Propane in the amount of .05 pore volume followed by 0.10 pore volume of carbon dioxide is injected into the core. After the carbon dioxide has been injected, the core is flooded with plain water or brine in a conventional manner. Oil recovery at a water-to-oil ratio of 100:1 is 55% of the oil originally in place and blowdown yields an additional 5%. Thus, in comparison, it can be seen that 17% more of the oil in place is removed by applying this invention than when employing a conventional method.

In another example, using a similar core under the same conditions, carbonated water or brine is injected into the core with the producing end shut-in until a pressure of 1150 p.s.i.g. is reached. Thereafter, 0.05 pore volume of propane followed by 0.10 pore volume of $CO_2$ is injected into the core and followed by carbonated water or brine. The producing end of the core is opened and fluids produced while maintaining the core pressure of 1150 p.s.i.g. The oil recovery at a water-to-oil ratio of 100:1 is 71% of the oil originally in place; after core depletion to atmospheric pressure, the total oil recovery is 83% of the original oil in place.

It has also been unexpectedly found that significant oil recoveries are also obtained even where a low-molecular-weight hydrocarbon solvent does not precede the carbon dioxide slug in the practice of this invention. For instance, a reservoir may be treated by simultaneously injecting gas into a production well and carbon dioxide and carbonated water into an injection well until pressures in excess of about 700 p.s.i. are reached. The reservoir is subsequently produced as heretofore described. In another embodiment of this feature of the invention, the production well is shut in while either water, carbonated water or gas is injected into the reservoir until the reservoir pressure is greater than about 700 p.s.i. Carbon dioxide and carbonated water are then injected and the producing well is opened and allowed to flow, maintaining the reservoir pressure in excess of 700 p.s.i., until an unattractively high water-oil ratio is reached. Further production of oil is stimulated by pressure depletion of the reservoir (blowdown). Exemplary of this modification in the invention are the following two examples.

In an 8 foot long Berea sandstone core containing 55% pore volume of a 40° API crude oil, having an internal pressure of less than 700 p.s.i.g., natural gas is injected into one end of the core while 0.15 pore volume of carbon dioxide, followed by carbonated water, is simultaneously injected into the other end. After a pressure of 1150 p.s.i.g. is reached, natural gas injection is terminated and fluids are produced from this end of the core until the water-oil ratio becomes high. The oil recovery after core depletion to atmospheric pressure is 67% of the original oil in place.

In an 8 foot long Berea sandstone core containing 55% pore volume of a 40° API crude oil, having an internal pressure of less than 700 p.s.i.g., the production end of the core is shut-in. Water is injected into the opposite end of the core until a pressure of 1150 p.s.i.g. is reached. Thereafter, 0.15 pore volume of carbon dioxide, followed by carbonated water, is injected into the same end of the core and fluids are produced from the core while maintaining the pressure at 1150 p.s.i.g. until the water-to-oil ratio reaches 100:1. The ultimate oil recovery after depletion to atmospheric pressure is 67% of the original oil in place.

The embodiments of the invention in which an exclusive property or privilege is claimed are defined as follows:

1. A process for producing a petroleum oil from an oil-bearing formation traversed by at least one injection well and one producing well which comprises:
    (a) shutting in said production well;
    (b) injecting gas into the injection well until a formation pressure of at least about 700 p.s.i. is attained;
    (c) thereafter opening said producing well and allowing fluids to be produced and simultaneously injecting in sequence into said injection well 0.01–0.1 reservoir pore volume of an oil-miscible liquefiable light hydrocarbon, .01–0.30 reservoir pore volume of carbon dioxide, and an aqueous driving fluid, the initial portion, at least 0.15 reservoir pore volume, of which is carbonated, while maintaining a formation pressure of at least about 700 p.s.i.; and
    (d) thereafter producing fluids from the production well, at a formation pressure of at least about 700 p.s.i., until the fluid produced contains a low oil-water ratio and then thereafter shutting in said injection well and producing fluids from said production well in an amount sufficient to reduce the pressure in said formation to a pressure substantially lower than 700 p.s.i.

2. A process according to claim 1 wherein the oil-miscible liquefiable light hydrocarbon has a maximum boiling point of about 300° C. at atmospheric pressure and is selected from the group consisting of propane, butane, naphtha, LPG, gasoline, natural gasoline, compressor condensate and kerosine.

3. A process according to claim 1 wherein gas is also simultaneously injected through said production well.

4. A process according to claim 3 wherein said gas injected into said reservoir through said injection and said production well is natural gas.

5. A process for producing oil from a low pressure oil-bearing petroleum reservoir traversed by at least one injection well and one production well, which comprises:
    injecting an oil-miscible solvent through said injection well and into said reservoir in sufficient quantity to raise the reservoir pressure from an initial pressure below about 700 p.s.i. to above about 700 p.s.i.;
    next injecting a slug of carbon dioxide through said injection well and into said reservoir while maintaining said reservoir at a pressure of at least about 700 p.s.i.;
    thereafter injecting an aqueous fluid through said injection well and into said reservoir to drive said solvent and carbon dioxide towards at least one spaced production well; and
    withdrawing fluid from said production well while maintaining said reservoir at a pressure of at least about 700 p.s.i.

6. A process according to claim 5 wherein said oil-miscible solvent is a light hydrocarbon liquefiable under reservoir conditions.

7. A process according to claim 6 wherein the oil-miscible, liquefiable light hydrocarbon has a maximum boiling point of about 300° C. at atmospheric pressure.

8. A process according to claim 5 wherein about 0.01 to 0.30 reservoir pore volume of said carbon dioxide is injected into said reservoir.

9. A process according to claim 5 wherein a first portion of said aqueous fluid injected into said reservoir is carbonated.

10. A process according to claim 5 including the step of initially injecting gas through said injection well and into said reservoir to establish a pressure therein above about 700 p.s.i. prior to the injection of said solvent.

11. A process according to claim 10 wherein gas is also simultaneously injected into said reservoir through said production well.

12. A process according to claim 5 including the additional steps of:
    discontinuing the injection of aqueous fluid upon the oil-water ratio of said produced fluid reaching a low level;
    thereafter closing said injection well; and
    producing fluids from said production well in an amount sufficient to reduce the pressure in said reservoir substantially below about 700 p.s.i.

13. A process according to claim 5 wherein said oil-miscible solvent is selected from the group consisting of propane, butane, naphtha, LPG, gasoline, natural gasoline, compressor condensate and kerosine.

14. A process for producing oil from a low pressure oil-bearing petroleum reservoir traversed by at least one injection well and one production well, which comprises:
  simultaneously injecting gas into said reservoir through both said injection and said production wells to increase the reservoir pressure from an initial value below about 700 p.s.i. to above about 700 p.s.i.;
  discontinuing the injection of gas upon the reservoir reaching a pressure above about 700 p.s.i., and thereupon sequentially injecting the following fluids through said injection well and into said reservoir while maintaining the reservoir pressure above 700 p.s.i.:
    (a) 0.01 to 0.1 reservoir pore volume of an oil-miscible, light hydrocarbon,
    (b) 0.01 to 0.3 reservoir pore volume of carbon dioxide, and
    (c) aqueous fluid to drive said solvent and carbon dioxide towards at least one spaced production well; and
  withdrawing fluid from said production well while maintaining a reservoir pressure of at least about 700 p.s.i.

15. A process according to claim 14 in which an initial portion of said aqueous fluid injected into said reservoir is carbonated.

16. A process according to claim 14 wherein the oil-miscible, light hydrocarbon has a maximum boiling point of about 300° C. at atmospheric pressure and is selected from the group consisting of propane, butane, naphtha, LPG, gasoline, natural gasoline, compressor condensate and kerosine.

References Cited
UNITED STATES PATENTS

| | | | |
|---|---|---|---|
| 2,623,596 | 12/1952 | Whorton et al. | 166—7 |
| 2,875,831 | 3/1959 | Martin et al. | 166—9 |
| 3,065,790 | 11/1962 | Holm | 166—9 |
| 3,084,743 | 4/1963 | West et al. | 166—9 |
| 3,175,609 | 3/1965 | Csaszar et al. | 166—9 |
| 3,207,217 | 9/1965 | Woertz | 166—9 |

CHARLES E. O'CONNELL, *Primary Examiner.*

STEPHEN J. NOVOSAD, *Examiner.*